(12) United States Patent
Ohtomo et al.

(10) Patent No.: US 6,921,491 B2
(45) Date of Patent: Jul. 26, 2005

(54) METHOD FOR FORMING A GROOVE AND METHOD FOR MANUFACTURING AN OPTICAL WAVEGUIDE ELEMENT

(75) Inventors: Katsuya Ohtomo, Tokyo (JP); Nobuaki Kitano, Tokyo (JP)

(73) Assignee: Hitachi Cable, Ltd. (JP)

( * ) Notice: Subject to any disclaimer, the term of this patent is extended or adjusted under 35 U.S.C. 154(b) by 0 days.

(21) Appl. No.: 10/320,080

(22) Filed: Dec. 16, 2002

(65) Prior Publication Data

US 2003/0116530 A1 Jun. 26, 2003

(30) Foreign Application Priority Data

Dec. 26, 2001 (JP) ........................................ 2001-395010

(51) Int. Cl.⁷ .............................................. B29D 11/00
(52) U.S. Cl. ............................ 216/24; 216/17; 216/18; 216/41; 385/14
(58) Field of Search ............................ 216/17, 18, 24, 216/41; 385/14

(56) References Cited

U.S. PATENT DOCUMENTS

| 4,988,157 A | 1/1991 | Jackel et al. ............. 350/96.13 |
| 5,171,706 A * | 12/1992 | Matsumoto et al. .......... 438/29 |
| 5,391,244 A * | 2/1995 | Kadomura ................... 438/695 |
| 6,304,687 B1 | 10/2001 | Inoue et al. .................. 385/14 |

FOREIGN PATENT DOCUMENTS

| JP | 04-146402 | 5/1992 |
| JP | 2001-051138 | 2/2001 |

* cited by examiner

Primary Examiner—Shamim Ahmed
(74) Attorney, Agent, or Firm—James B. Conte; Barnes & Thornburg LLP

(57) ABSTRACT

A method for forming a groove which enable exact formation of vertical wall surface and a method for manufacturing an optical waveguide element such as an optical switch and an optical multiplexer/demultiplexer applying this forming method are provided. Such method comprising forming a sacrifice covering layer having predetermined thickness over said predetermined layer, performing dry etching from upper of said sacrifice covering layer, and decreasing gas being contained in etching gas generated by said dry etching processing and containing plenty of movement component to horizontal direction by collide with a wall surface in a groove formed through said sacrifice covering layer, and forming said groove through said predetermined layer positioned under said sacrifice covering layer by gas containing mainly movement component to vertical direction.

7 Claims, 7 Drawing Sheets

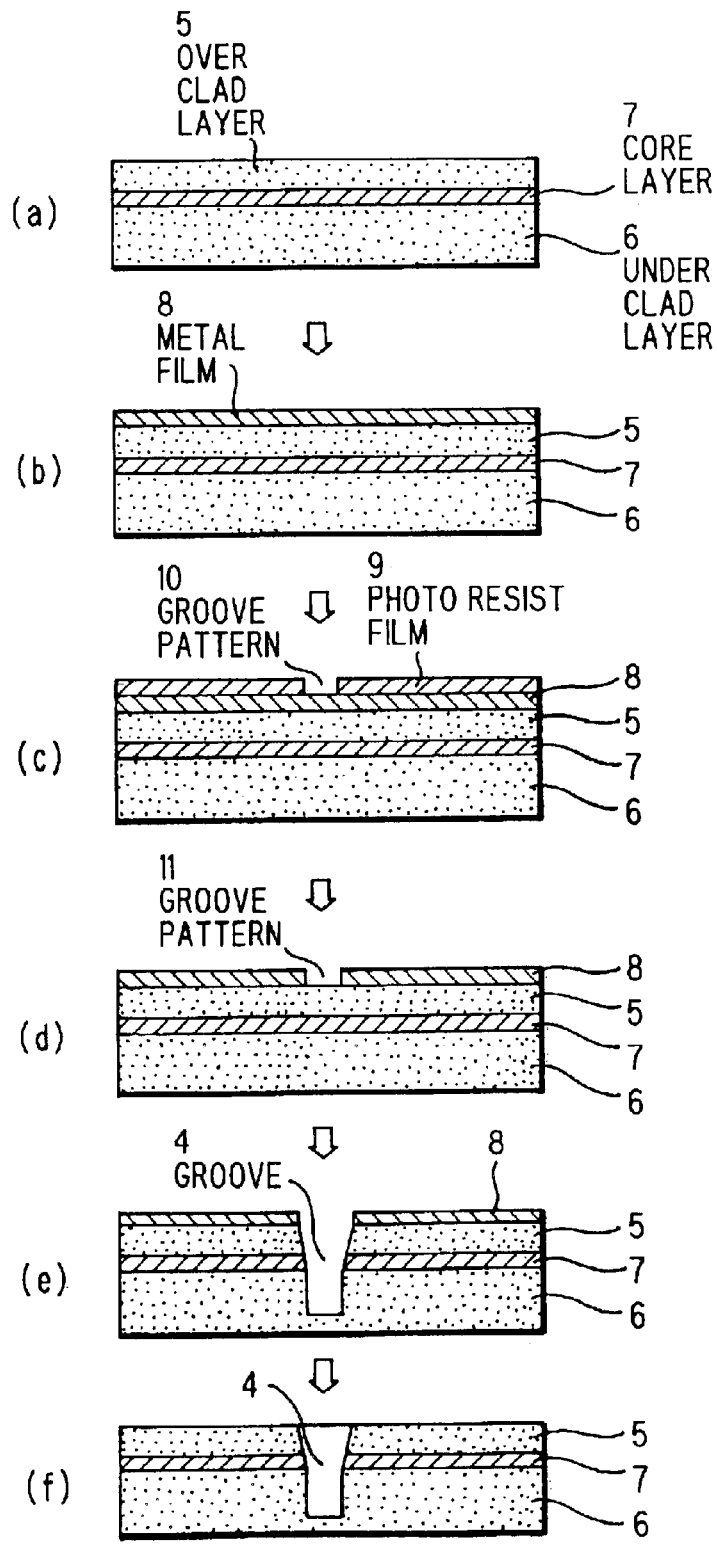

METHOD FOR FORMING A GROOVE AND METHOD FOR MANUFACTURING AN OPTICAL WAVEGUIDE ELEMENT

BACKGROUND OF THE INVENTION

1. Field of the Invention

The present invention relates to a method for forming a groove and a method for manufacturing an optical waveguide element, and more specifically to a method for forming a groove that enable exact formation of vertical wall surface and a method for manufacturing an optical waveguide element applying this forming method.

2. Prior Art

An optical waveguide element formed by covering a large refractive index core layer with a small refractive index clad layer to transmit an optical signal has been used practically as various optical communication parts.

FIG. 1A and FIG. 1B show a waveguide type optical switch having a groove formed at crossing of a plurality of waveguides each of which is a kind of said optical waveguide element. In FIG. 1A, numeral 1 denotes an input waveguide into which an optical signal is entered, numerals 2 and 3 denote output waveguides which are branched at angle of 90 degrees each other from the input waveguide 1, and numeral 4 denotes a groove which is formed at 45 degrees to orthogonal crossing potion of the output waveguides 2 and 3.

As shown in FIG. 1B, the input and output waveguides 1, 2 and 3 comprising a core layer 7 which is quadrangular in cross section and covered upper and lower portions by the over clad layer 5 and the under clad layer 6. Further, the groove 4 is formed vertically from the over clad layer 5 through the core layer 7.

The above explained optical switch emits an optical signal from output waveguide 3 or 2 by thermally evaporating or condensing liquid which has refractive index of almost the same as the core layer 7 and is filled in the groove 4, thereby high speed switching function which changes propagating direction of an optical signal is provided, and is highly evaluated as switch parts of optical communication. Details of such optical switch are disclosed in Japanese laid-open patent number 04-146402.

FIG. 2 shows forming method of the groove 4 which is an important component of said optical switch.

In step (a), a composite material comprising the core layer 7, the over clad layer 5 covering upper of the core layer 7 and the under clad layer 6 covering lower of the core layer 7 is prepared.

In step (b), a metal film 8 such as Cr film is formed on the over clad layer 5 by electron beam evaporating or spattering.

In step (c), a photo resist film 9 is formed over the metal film 8, thereafter a resist film groove pattern 10 is formed according to a groove pattern to be formed by performing exposure and development.

In step (d), a metal filmgroovepattern 11 is formed by etching processing masked with the resist film 9 and successive removing treatment of the resist film 9.

In step (e), the groove 4 is formed by dry etching processing such as reactive ion etching (RIE) masked with the metal film 8.

Finally, in step (f), the optical switch as shown in FIG. 1A and B is completed by removing the metal film 8.

The method for forming a groove using dry etching processing as explained above is suitable for formation of a groove of an optical switch that fine width dimension such as ten and several μm or several μm order is required. Further, this method is also applicable, for example, to formation of a groove for filling temperature compensating material in temperature nondependent optical multiplexer/demultiplexer disclosed in Japanese laid-open patent number 2001-051138.

However, according to conventional method for forming a groove, verticality of wall surface in a groove become frequently imperfect, thereby, for example, in case of an optical switch, problem that reflecting loss is increased by optical axis difference of reflecting light caused in the groove 4 is arisen.

To explain the cause of this problem, the movement of the etching gas 12 at dry etching processing is shown in FIG. 3. Namely, the gas 13 containing plenty of movement component to horizontal direction and being contained in the etching gas 12 acts to form a taper portion 14 on upper wall surface in the groove 4, if this reaches to core layer 7, axis difference of reflected light is caused by the taper portion 7a to lower the ability of an optical switch.

Influence of insufficient verticality of wall surface in a groove is a problem which occurs not only in an optical switch but also in a temperature compensating material of temperature nondependent optical multiplexer/demultiplexer, insufficient verticality acts to lower ability of an optical multiplexer/demultiplexer as optical parts.

SUMMARY OF THE INVENTION

An object of the present invention is to provide a method for forming a groove which enable exact formation of vertical wall surface and a method for manufacturing an optical waveguide element such as an optical switch and an optical multiplexer/demultiplexer applying this forming method.

In accordance with the first feature of this invention, there is provided a method for forming a groove having a vertical wall surface through a predetermined layer by dry etching said predetermined layer, comprising forming a sacrifice covering layer having predetermined thickness over said predetermined layer, performing dry etching from upper of said sacrifice covering layer, and decreasing gas being contained in etching gas generated by said dry etching processing and containing plenty of movement component to horizontal direction by collide with a wall surface in a groove formed through said sacrifice covering layer, and forming said groove through said predetermined layer positioned under said sacrifice covering layer by gas containing mainly movement component to vertical direction.

Further, in accordance with the present invention, there is provided a method for manufacturing an optical waveguide element including a step for forming a groove at a predetermined portion of a waveguide, comprising forming a sacrifice covering layer having a predetermined thickness on said waveguide, performing dry etching from upper of said sacrifice covering layer, and decreasing gas being contained in etching gas generated by said dry etching processing and containing plenty of movement component to horizontal direction by collide with a wall surface in a groove formed through said sacrifice covering layer, and forming said groove through said waveguide positioned under said sacrifice covering layer by gas containing mainly movement component to vertical direction.

In the present invention, said sacrifice covering layer is formed as sacrificial existence which decreases energy of movement component to horizontal direction of etching gas by receiving itself corrosive action of movement component to horizontal direction of etching gas. Any materials without limitation may available to form a sacrifice covering layer as long as they can form a layer having enough thickness to receive movement component to horizontal direction of etching gas. Further, this sacrifice layer is formed directly over a predetermined layer to be processed dry etching, or indirectly through other intervening layer.

Example of said intervening layer is an over clad layer of an optical waveguide element for use in an optical switch. In this case, a groove is formed through said over clad layer. A groove may be formed through not only an over clad layer and a core layer but also three layers including an under clad layer. These methods for forming a groove are applicable to a manufacture of an optical multiplexer/demultiplexer.

A sacrifice covering layer may also be formed by prolonging other layer such as an over clad layer formed over a core layer. In this case, said sacrifice covering layer is formed by material constituting another layer, and the thickness of said another layer is increased greater than its inherent thickness.

A groove pattern may be formed by performing exposure and development to a photo resist film after formation of a photo resist film over a predetermined layer to be processed or another layer over it, or may be formed by utilizing a photo resist film as a sacrifice covering layer. In this case, it is necessary for said photo resist film to have enough thickness to decrease energy of movement component to horizontal direction of etching gas by receiving collision of etching gas.

A sacrifice covering layer in the present invention may be formed by laminating a plural of materials, for example, upper layer is formed by etching resistant material and lower layer is formed by excellent dissoluble or melt material to increase electing ratio of dry etching and removability of said sacrifice covering layer.

A method for manufacturing an optical waveguide element applying a method for forming a groove of the present invention is applicable not only to manufacture of an optical switch or a temperature nondependent optical multiplexer/demultiplexer but also to manufacture of other optical waveguide element requiring verticality to a wall surface of a groove.

BRIEF DESCRIPTION OF THE DRAWINGS

FIG. 2 is an explanatory view showing a conventional groove forming method.

DESCRIPTION OF THE PREFERRED EMBODIMENTS

Preferred embodiments of the present invention will be explained in conjunction with accompanying drawings.

Figure 1A:
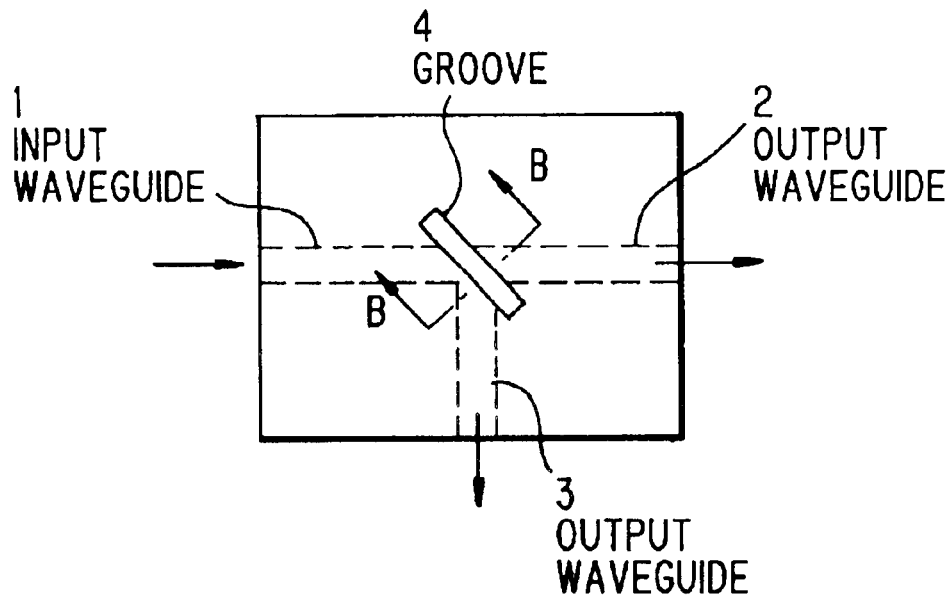
FIG. 1A is a plan view showing a waveguide type optical switch having a groove formed at crossing of a plurality of waveguides.
Figure 1B:
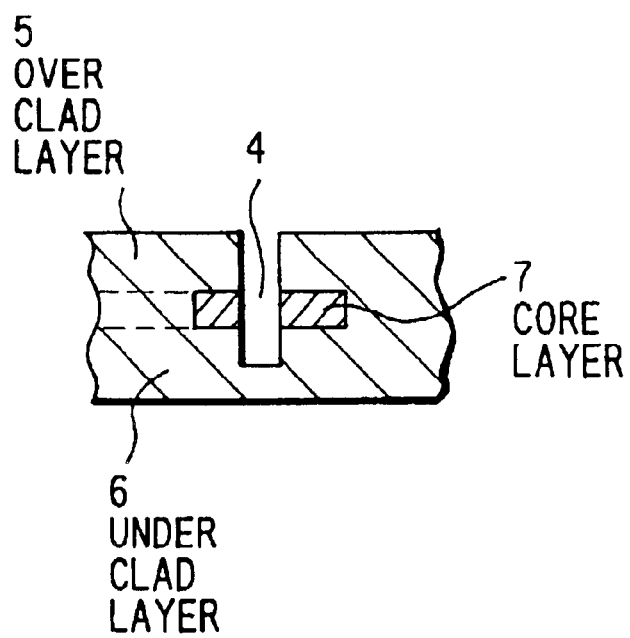
FIG. 1B is a cross sectional view showing B—B line of FIG. 1A.
Figure 3:
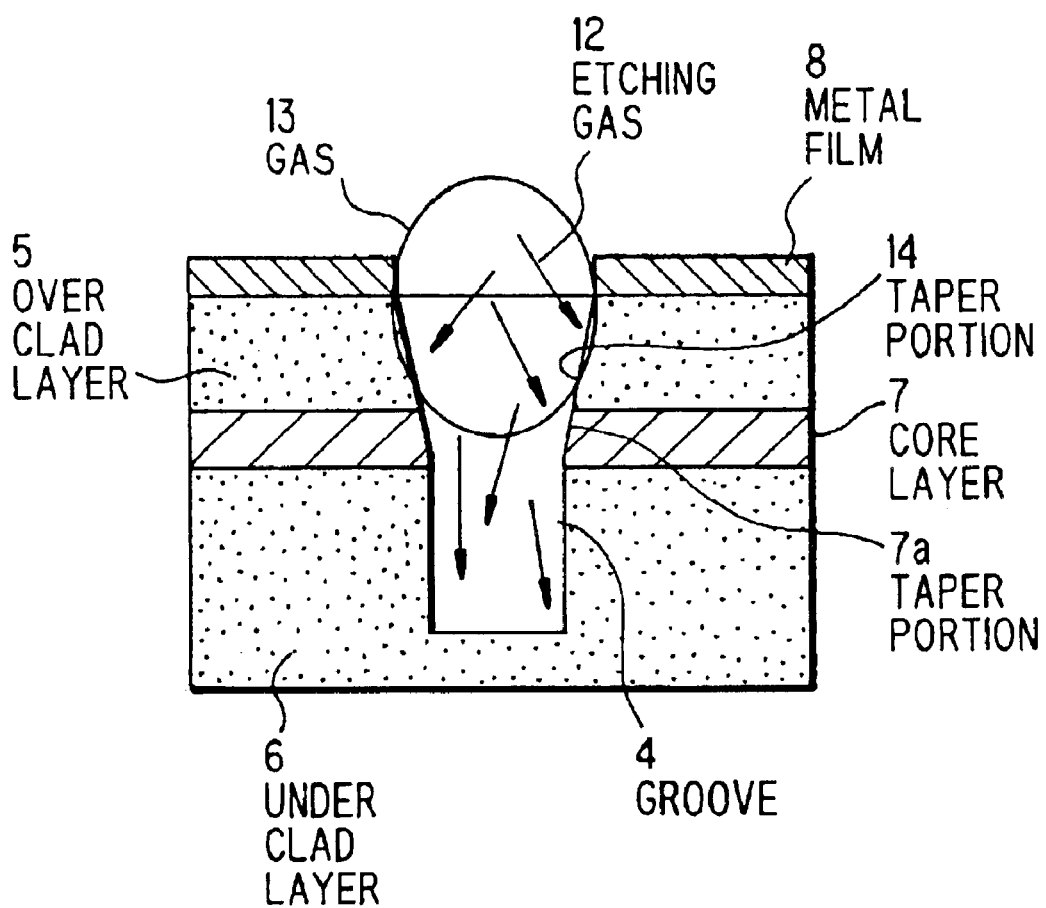
FIG. 3 is an explanatory view showing an action of etching gas in a step (e) of FIG. 2.
Figure 4:
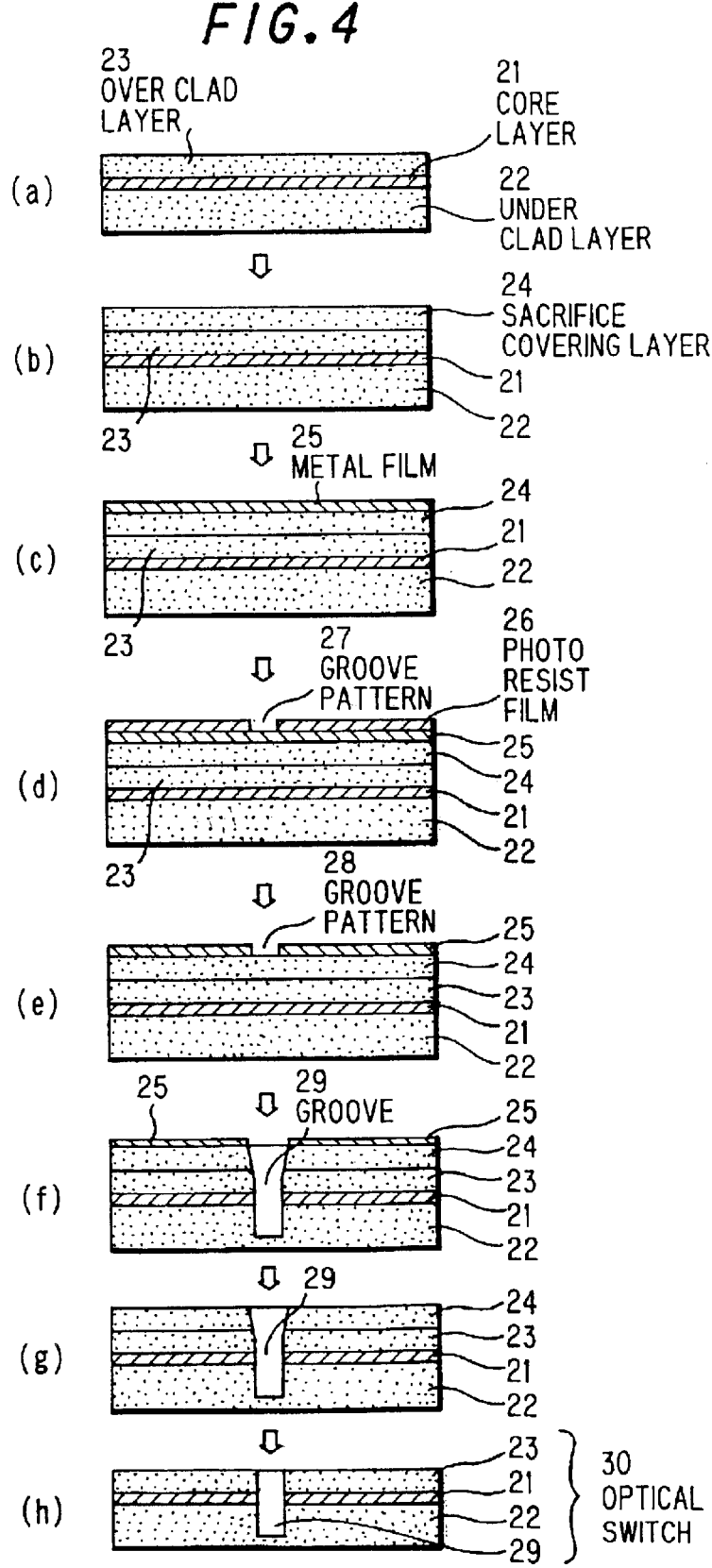
FIG. 4 is an explanatory view showing an embodiment of the present invention applied to formation of a groove in a process of manufacturing a waveguide type optical switch.

FIG. 4 shows an embodiment of the present invention applied to formation of a groove in a process of manufacturing a waveguide type optical switch.

In step (a), a composite material comprising a core layer 21 constituting input waveguide and output waveguide, quadrangular in cross section and having large reflective index, an under clad layer 22 covering lower portion of the core layer 21 and an over clad layer 23 covering upper portion of the core layer 21 is prepared.

In step (b), a sacrifice covering layer 24 is formed on the over clad layer 23 by CVD method.

In step (c), a metal film 25 is formed over the sacrifice covering layer 24 by electron beam evaporating.

In step (d), a photo resist film 26 is formed over the metal film 25, thereafter a resist film groove pattern 27 is formed by performing exposure and development.

In step (e), a metal film groove pattern 28 is formed by etching processing masked with the resist film 26 and successive removing treatment of the resist film 26.

In step (f), a groove 29 is formed by dry etching processing such as reactive ion etching (RIE) masked with the metal film 25 through the under clad layer 22, the core layer 21, the over clad layer 23 and the sacrifice covering layer 24.

In step (g) and (h), an optical switch 30 as shown in the figure is completed by removing successively the metal film 25 and the sacrifice covering layer 24 by polishing processing.

According to the method for forming a groove carried out by the above procedure, since dry etching processing in step (f) is performed under condition that the sacrifice covering layer 24 has been formed already, the groove 29 can be formed under condition that the influence of the movement component to horizontal direction in the etching gas to the core layer 21 is suppressed to a minimum.

Figure 5:
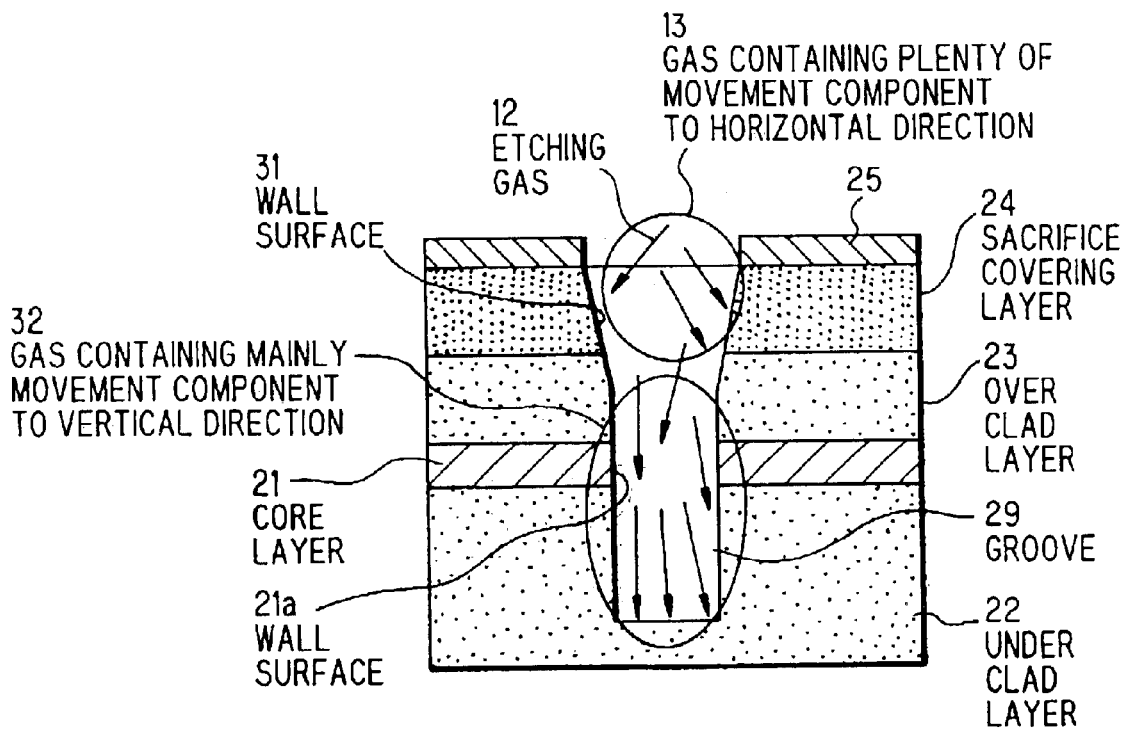
FIG. 5 is an explanatory view showing an action of etching gas in a step (f) of FIG. 4.

FIG. 5 illustrates an action of the etching gas in step (f) Because the gas 13 containing plenty of movement component to horizontal direction and being contained in the etching gas 12 is decreased before acting to the core layer 21, by collision with the wall surface 31 in the groove which is formed through the sacrifice covering layer 24 together with progress of dry etching processing, corrosive action to the core layer 21 is carried out by the gas 32 containing mainly movement component to vertical direction. Therefore, wall surface 21a of the core layer 21 in the groove 29 is formed exactly vertical.

Apparent from the above description, formation of the taper shaped wall surface 31 caused by the gas 13 containing plenty of movement component to horizontal direction is restricted to the sacrifice covering layer 24 and a part of the over clad layer 23 both of which are independent of light signal transmission, therefore, manufacture of a high performance optical switch preventing optical axis difference of reflected light become possible. In addition, if the formation of the taper shaped wall surface is desired to restrict only in the sacrifice covering layer 24, thickness of the sacrifice covering layer 24 should be increased to absorb movement component to horizontal direction.

Figure 6:
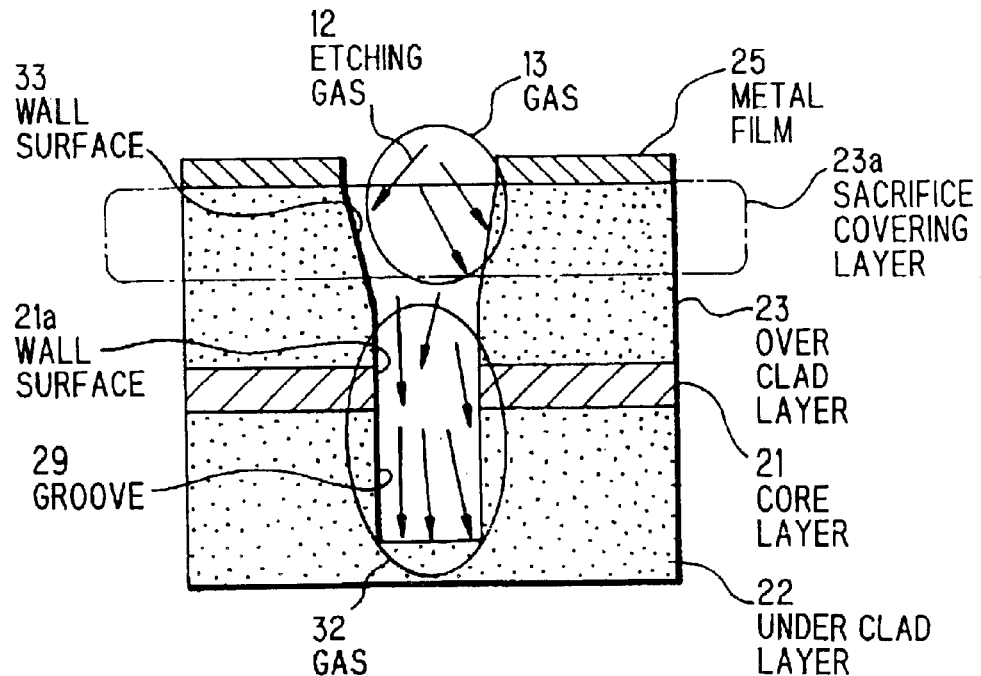
FIG. 6 is an explanatory view showing another embodiment of the present invention applied to formation of a groove in a process of manufacturing a waveguide type optical switch.

FIG. 6 shows another embodiment of the present invention applied to formation of a groove in a process of manufacturing a waveguide type optical switch. In this embodiment, the sacrifice covering layer 24 for use in etching is consisting of over clad layer 23 itself instead of forming on the over clad layer 23 as shown in FIG. 4. Namely, this embodiment is characterized in that a prolonged portion is formed as the sacrifice covering layer 24 on the over clad layer 23. The gas 13 containing plenty of movement component to horizontal direction and being contained in the etching gas 12 is decreased by collision with the wall surface 33 in the groove 29 which is formed through the sacrifice covering layer 23a together with progress of dry etching, therefore, wall surface 21a of the core layer 21 is formed exactly vertical by the gas 32 containing mainly movement component to vertical direction as same as the embodiment shown in FIG. 4. In addition, the sacrifice covering layer 23 and metal film 25 are finally removed by polishing processing.

Figure 7:
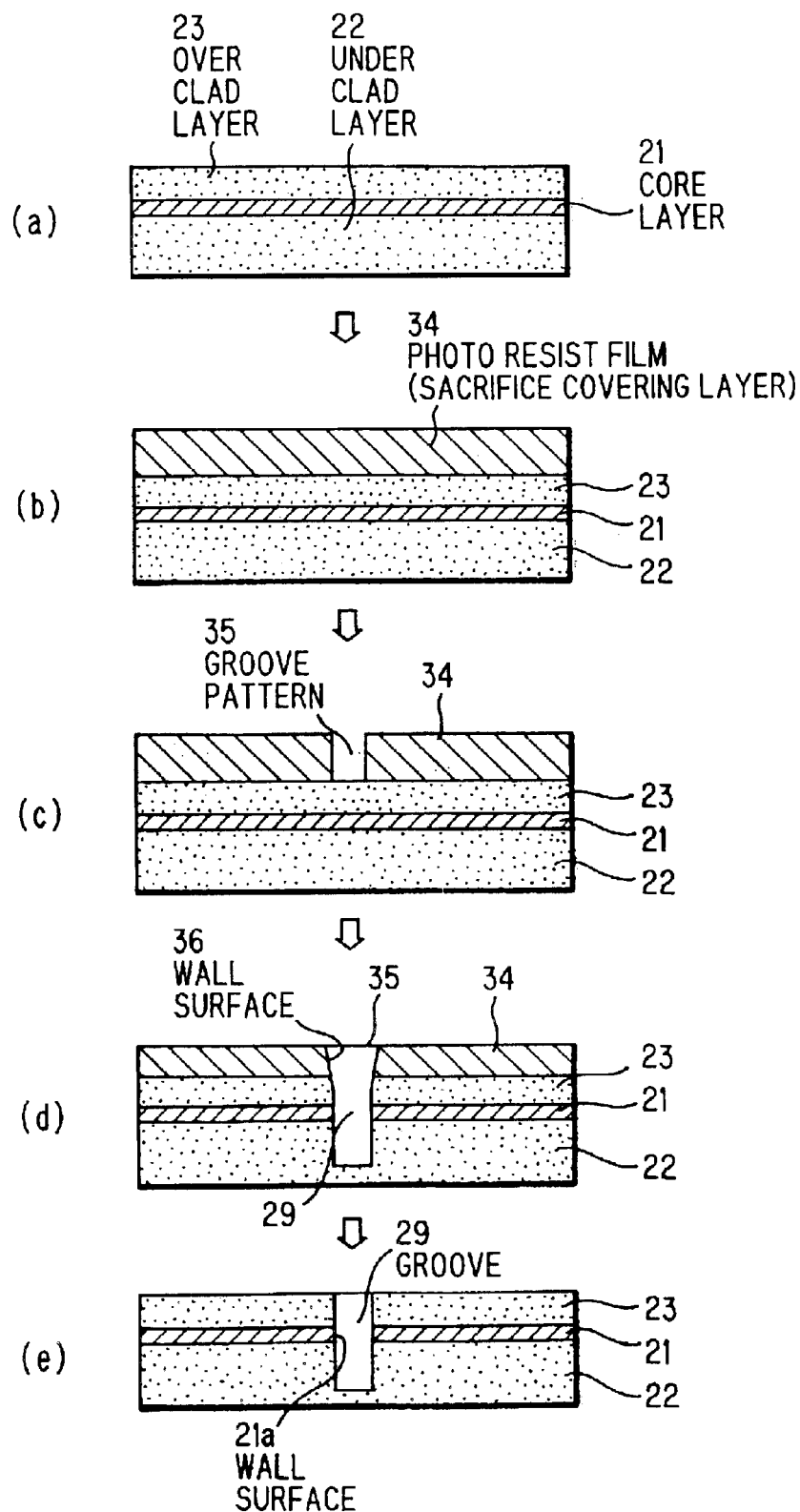
FIG. 7 is an explanatory view showing still another embodiment of the present invention applied to a formation of groove in a process of manufacturing a waveguide type optical switch.

FIG. 7 shows still another embodiment of the present invention applied to a formation of groove in a process of manufacturing a waveguide type optical switch.

In step (a), a composite material comprising a core layer 21 disposed predetermined pattern and quadrangular in cross section, an under clad layer 22 covering lower of the core layer 21 and an over clad layer 23 covering upper of the core layer 21 is prepared.

In step (b), a photo resist film 34 is formed on the over clad layer 23.

In step (c), a resist film groove pattern 35 is formed by performing exposure and development to the photo resist film 34. In addition, the photo resist film 34 in this embodiment is given function as etching mask for formation of the groove and as a sacrifice covering layer, therefore, the photo resist film 34 is formed thicker than the photo resist film 26 shown in FIG. 4 to perform the latter function.

In step (d), dry etching processing is performed to the composite material, thereby the groove 29 is formed through under the clad layer 22, the core layer 21 and the over clad layer 23.

In step (e), a desired optical switch 30 is completed by removing the photo resist film 34 by solution in organic or inorganic solvent, plasma-ashing or etc..

According to the method for forming a groove carried out by this embodiment, the gas containing plenty of movement component to horizontal direction at dry etching in step (f) is decreased by collision with the wall surface 36 in the groove pattern formed through the photo resist film 34, therefore, a wall surface 21a of the core layer 21 is formed exactly vertical by the gas mainly comprising of movement component to vertical direction. Therefore, optical axis difference of reflected light in the completed product is prevented as same as the case of the embodiment shown in FIG. 4.

Figure 8:
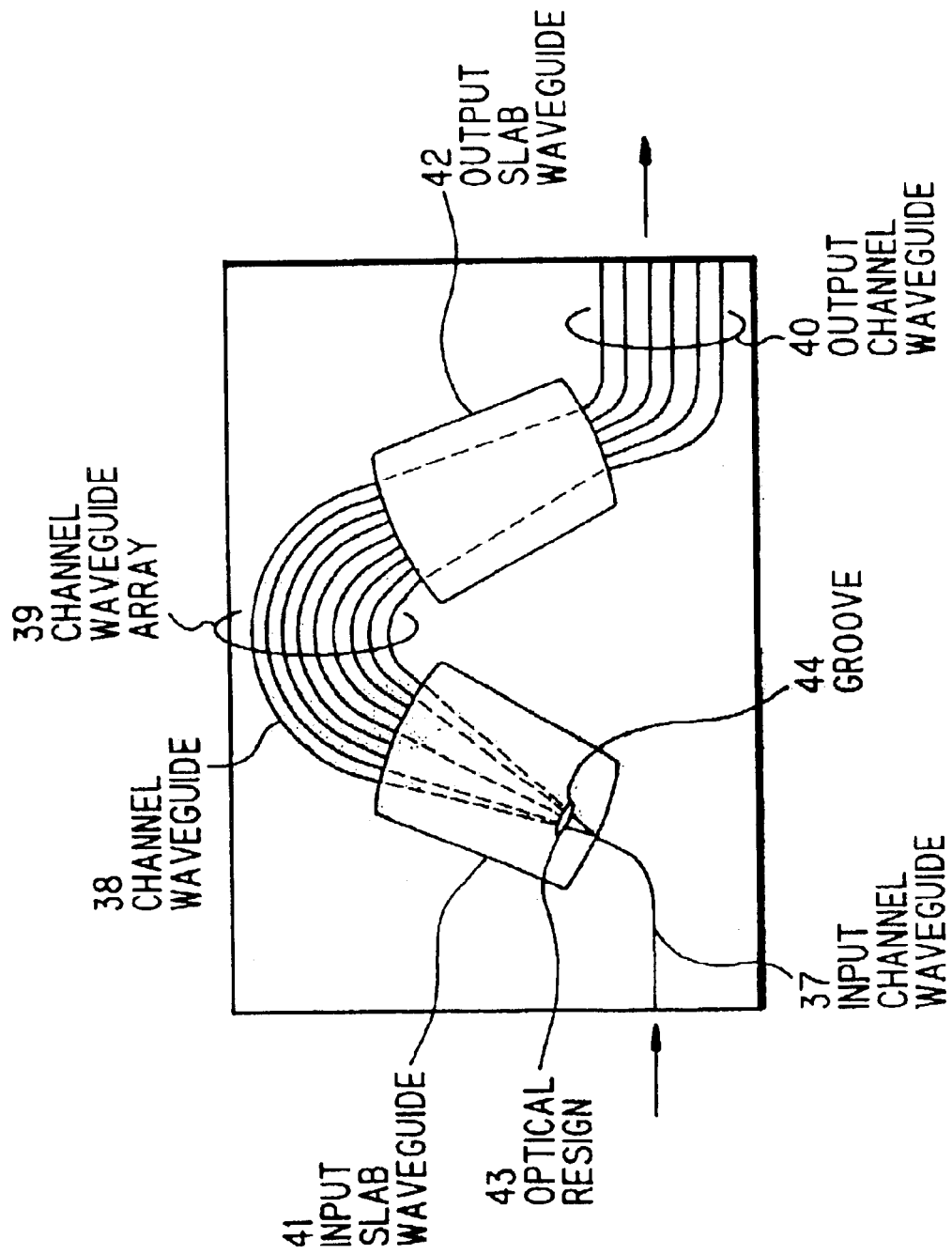
FIG. 8 is an explanatory view showing a temperature nondependent optical multiplexer/demultiplexer manufactured by applying an embodiment for forming a groove of the present invention.

FIG. 8 shows a temperature nondependent optical multiplexer/demultiplexer manufactured by applying an embodiment for forming a groove of the present invention. The temperature nondependent optical multiplexer/demultiplexer comprising, a single input channel waveguide 37 arranged at one end and introduce an optical signal, channel waveguide array 39 positioned in the center and arranged differentiating each waveguide length by curving a plurality of channel waveguide 38 in parallel, a plurality of output channel waveguides 40 arranged at other end, an input slab waveguide 41 arranged between the channel waveguide array 39 and the input channel waveguide 37, and an output slab waveguide 42 arranged between the channel waveguide array 39 and the output channel waveguides 40.

A groove 44 filled with temperature compensating optical resign 43 such as silicone group or epoxy group is formed in the input slab waveguide 41, thereby, preventing fluctuation by temperature change at equiphase face at the output end of the channel waveguide array 39.

To achieve sufficient ability of the optical multiplexer/demultiplexer, it is necessary to form a wall surface of the groove 44 as vertical as possible, namely, methods explained in FIGS. 4, 6 and 7 are suitable. Though detailed explanation being abbreviated to avoid double description, in the manufacture of this optical multiplexer/demultiplexer, either of the methods explained in FIGS. 4, 6 and 7 is applied, therefore, an optical multiplexer/demultiplexer having vertical wall surface in a groove and excellent temperature compensation characteristic is provided. In addition, a groove filled with optical resign can be formed in the output slab waveguide 42 or crossing the channel waveguide array 39.

As described above in detail, according to a method for forming a groove and a method for manufacturing an optical waveguide element of the present invention comprising forming a sacrifice covering layer having predetermined thickness over said predetermined layer, performing dry etching from upper of said sacrifice covering layer, and decreasing gas being contained in etching gas generated by said dry etching processing and containing plenty of movement component to horizontal direction by collide with a wall surface in a groove formed through said sacrifice covering layer, and forming said groove through said predetermined layer positioned under said sacrifice covering layer by gas containing mainly movement component to vertical direction, a wall surface of a groove is formed exactly vertical, and provide excellent characteristic to a manufactured optical waveguide element.

What is claimed is:

1. A method for forming a groove having a vertical wall surface through a predetermined layer by dry etching said predetermined layer on which an optical waveguide element is formed, comprising:

forming a sacrificial covering layer having predetermined thickness over said predetermined layer:

forming a metal groove pattern on said sacrificial covering layer; performing dry etching from an upper surface of said sacrificial covering layer through said metal film groove pattern, making etching gas generated by said dry etching processing and containing a movement component in the horizontal direction that collides with a wall surface in the groove formed through said sacrificial covering layer; and forming a tapered portion of the groove at said sacrifice covering layer, said collision decreasing said movement component in the horizontal direction in said etching gas;

forming the groove having vertical wall through said predetermined layer positioned under said sacrificial covering layer by said etching gas containing mainly movement component in the vertical direction and removing said sacrifice covering layer.

2. A method for forming a groove according to claim 1, wherein said dry etching is performed from upper of said sacrificial covering layer which is formed over said predetermined layer through an intervening layer.

3. A method for forming a groove according to claim 2, wherein said intervening layer is formed to have a prolonged portion which fulfills a role of said sacrificial covering layer, and said dry etching is performed from upper of said intervening layer.

4. A method for forming a groove according to claim 1, wherein said dry etching is performed by utilizing a photo resist film for said sacrificial covering layer, said photo resist film being formed over said predetermined layer as a mask to obtain a groove having a predetermined pattern and being formed to have enough thickness to decrease gas containing plenty of movement component to horizontal direction by collide with the wall surface in the groove formed through said resist film.

5. A method for manufacturing an optical waveguide element including a step for forming a groove at a predetermined portion of a waveguide element comprising a core and a clad layer, comprising:

forming a sacrificial covering layer having a predetermined thickness on said clad layer;

forming a metal film groove pattern on said sacrificial covering layer; performing dry etching from an upper surface of said sacrificial covering layer, etching gas generated by said dry etching processing containing a movement component in the horizontal direction that collides with a wall surface in the groove, forming a tapered portion in the groove at said sacrificial covering layer, said collision decreasing said movement in the horizotal direction in said etching gas;

forming said groove through said waveguide positioned under said sacrificial covering layer by gas containing mainly movement component in the vertical direction.

6. A method for manufacturing an optical waveguide according to claim 5, wherein said step for forming a groove is performed to form a groove of a waveguide type optical switch which formed a groove at crossing portion of a plurality of cores.

7. A method for manufacturing an optical waveguide according to claim 5, wherein said step for forming a groove is performed to form a groove of an optical multiplexer/demultiplexer arranging at a predetermined portion on a substrate a channel waveguide array differentiating each waveguide length by curving a plurality of channel waveguides in parallel, an input slab waveguide connected to one side of said channel waveguide array, an output waveguide connected to other side of said channel waveguide array, an input channel waveguide connected to said output slab waveguide, forming a groove at said input slab waveguide, said output slab waveguide or said channel waveguide array, and filling said groove with temperature compensating material having reverse sign of reflective index temperature change to said plural waveguides.

* * * * *